United States Patent Office 3,515,038
Patented June 2, 1970

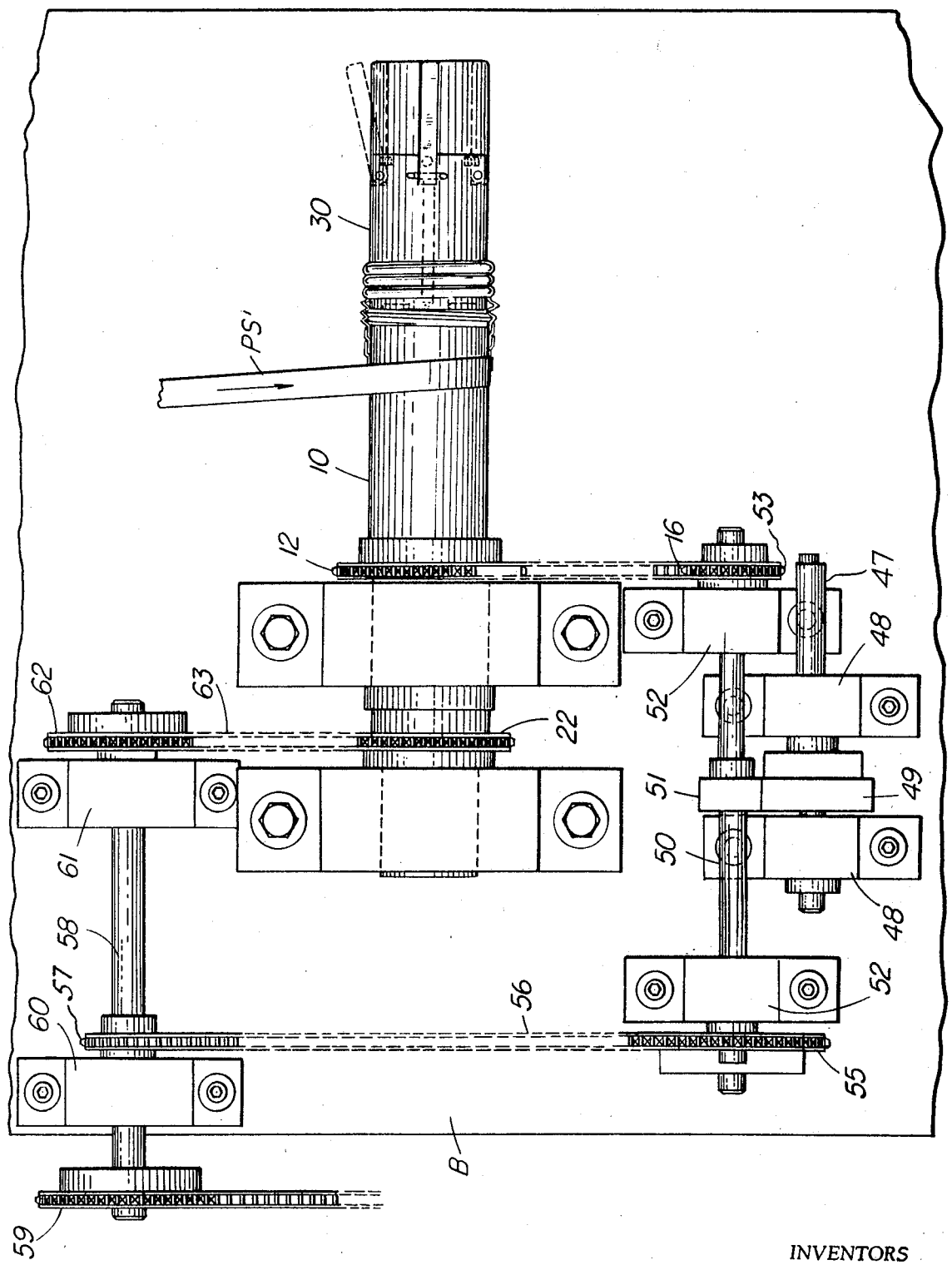

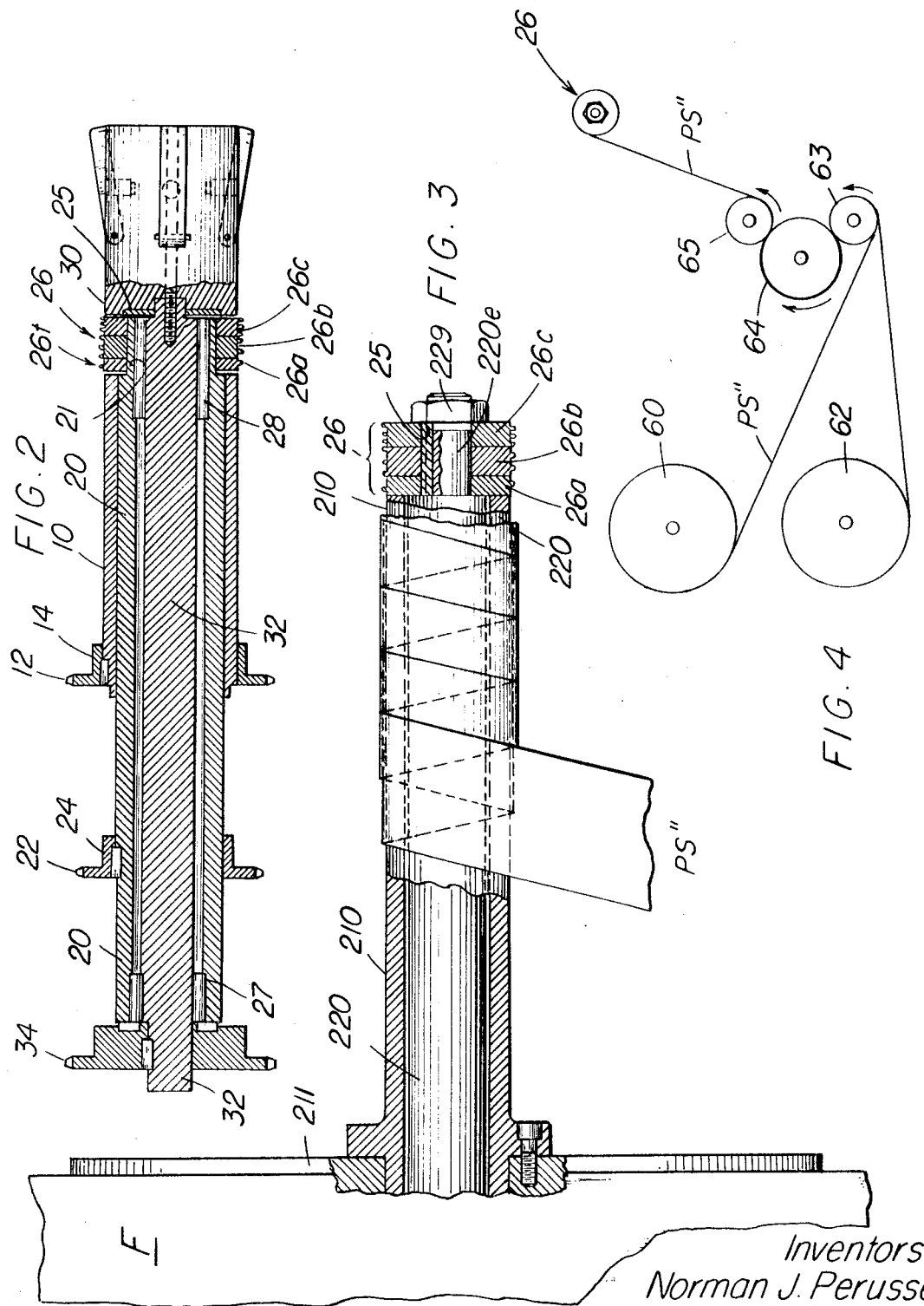

3,515,038
HELICALLY RIBBED TUBING AND METHOD AND APPARATUS FOR MAKING THE SAME
Norman J. Perusse, Bristol, and Wilbur D. Cheever, Wethersfield, Conn., assignors to The Wiremold Company, West Hartford, Conn., a corporation of Connecticut
Continuation-in-part of applications Ser. No. 523,825, Dec. 16, 1965, and Ser. No. 573,704, Aug. 19, 1966. This application Aug. 31, 1967, Ser. No. 664,841
Int. Cl. B31c 1/00
U.S. Cl. 93—80
10 Claims

ABSTRACT OF THE DISCLOSURE

One or more strips of material capable of being wound helically on a mandrel into a cylindrical tube, in single or multi-ply form, and of having helical grooves and ridges formed therein, are acted upon internally by helical ribs on a rotating ring to create the helical ridges. The formed tubing is threaded onto one or more peripherally threaded or helically ridged elements, the convolutions of which are of progressively reduced pitch causing the helical ridges of the tubing to be pressed axially together and compacted.

---

This application is a continuation-in-part of our copending applications Ser. No. 523,825, filed Dec. 16, 1965, now Pat. No. 3,472,131 and Ser. No. 573,704, filed Aug. 19, 1966, now Pat. No. 3,472,132 both entitled "Helically Ribbed Tubing and Method and Apparatus for Making the Same."

The invention of this application relates to helically wound and corrugated tubing formed from a strip or strips of metal foil or snythetic plastic material or fabric or plain, coated, impregnated or lined paper, or other flexible materials or combinations thereof which are capable of being pressed and formed into helical corrugations or ridges and grooves and retaining such formation as the tubing is formed and thereafter.

More specifically, the invention relates to a method and machine for making such tubing.

The machine and method herein disclosed are modified and improved forms of the inventions described in said copending applications. Prior to the inventions of our co-pending applications, it had been known to make flexible and collapsible helically wound tubing made from thin strips formed of various materials. One commercially accepted form of two-element tubing, comprised of flexible and metallic strips with the edges of adjacent convolutions interengaged or interlocked, had been widely used in conduction of air and other gases. Such tubing, however, is relatively expensive. Thus, a need existed for flexible tubing made of less expensive materials.

One object of the invention herein disclosed is to provide an improved and simplified machine requiring a minimum number of parts for creating, continuously improved helically wound flexible and collapsible tubing of single ply or multi-ply type and made of one or more elements or strips of materials which are capable of being pressed and formed into helical corrugations or convoluted ridges and grooves as the tubing is generated.

Another object is to provide a novel and improved method for making such tubing continuously with reference particularly to the means for forming and compressing the convolutions of the tubing.

Another object is to provide such tubing and the means and method for making the same continuously from strip material, with one or more of such strips coated or lined with a material or materials so that the resulting tubing is waterproof and impervious to the passage of gases.

Other objects and advantages of the invention will appear as it is described in connection with the accompanying drawings.

In the drawings:

FIG. 1 is a plan view of a machine embodying the invention.

FIG. 2 is a longitudinal section view of the combination of mandrels and forming ring employed in FIG. 1.

FIG. 3 is a longitudinal section view of another, simplified form of the invention without a compression mandrel and with a stationary guide mandrel.

FIG. 4 is a diagrammatic view of an arrangement of rolls by which the strip material is fed to the guide mandrel and forming rings, particularly suited to the FIG. 3 form.

This invention will be described with relation to, and in the respects that it corresponds to and differs from, the inventions of our above-identified copending applications.

Before describing with reference to the drawings the mechanism for driving the various forming implements and tools which act on the materials to form the tubing, we will described the assembly, the functions and the cooperation of the tube forming implements and tools in connection with the feeding to the assembly of the raw materials, i.e. the strip or strips of single-ply or laminated material.

Referring to the drawings and viewing the invention broadly, a strip or strips of the material or materials to be formed into tubing go through several stages, including winding a cylindrical tube from strip material, or materials, forming helical convolutions or ridges therein, and compressing axially the convolutions. As is hereinafter described, the strip material is drawn through these stages by the frictional drag of a forming element or rings such as 26a, 26b and 26c (designated generally as 26) which work upon the strip material. Inclusion of a compression mandrel 30 in the machine is possible (as shown in FIGS. 1 and 2) but it need not necessarily be used (as shown in FIG. 3). When used, it follows the working of the strips by the forming rings. Even when a compression mandrel is used, it is believed the main force acting to draw the strip along is exerted by the forming element or rings.

The strip material reaches the forming elements or rings after being wound helically around a guide mandrel 10 in cylindrical form.

As will be more fully described hereinafter, the guide mandrel 10 may be stationary or may rotate. The forming rings 26 may rotate in either direction, but must turn in the same direction as the tubing. When a compression mandrel is used the formed, convolutely-ribbed tubing is fed onto it from the forming instrumentalities. The compression mandrel 30 will rotate. It is best to allow it to rotate freely.

Turning now to the structure of the machine and referring to FIG. 2, the guide mandrel 10 is hollow and cylindrical with a smooth continuous cylindrical surface and is rotatably mounted on one end of a hollow shaft 20. Mandrel 10 may be rotated by a sprocket 12 keyed to the mandrel by key 14 or the mandrel may remain stationary. It has been found that in most instances it is better for mandrel 10 to be stationary.

The hollow shaft 20 may be rotated by a sprocket 22 to which it is keyed by key 24. The sprocket 22 is located between the mandrel-driving sprocket 12 and one end of hollow shaft 20, while on the opposite end of that shaft are the forming element or rings. The forming rings may be narrow annular rings 26a, 26b and 26c which are secured upon an extension 21 of hollow shaft 20 and keyed to or otherwise required to rotate therewith. The forming rings may be rotated in either direction as hereinafter described but should turn in the same direction as the tubing. The forming rings have their peripheries machined to form helical threads or ridges, for the purpose of forming exteriorly extending helical convolutions in the tubing and compressing or compacting the convolutions as they move along, as will be more fully described below.

The first ring 26a is provided so that when a strip of paper PS' or other material is fed to and wound around the mandrel 10, helically, and up to and around the forming ring, the forming ring creates exteriorly extending helical convolutions in the paper strip PS' of the thus formed tubing.

The ridge 26t on the ring 26a may be a single thread. To facilitate the starting and forming of the thread-like helical ridge and groove contour of the tubing, the thread ridge of the forming ring 26a tapers from the root diameter of the forming ring to a maximum at the outgoing end. Alternatively, two or more such ridges may be formed as a multiple thread, tapering as just stated.

When a single lead thread is used on the forming ring 26a, that thread is usually made to total somewhat more in length than one complete turn of the forming ring. When multiple threads are used, their total combined length is still only somewhat more than one complete turn of the forming ring because one thread must end before the next one begins to rise much above the surface of the guide mandrel.

In order that the helical ridge or thread shall cause formation of multiple helical convolutions in each convolution of the strip, like unto formation of an internal thread, there must be a difference in the peripheral speed of the forming ring thread with respect to the speed of the strip material.

The forming ring turns in the same direction, but faster than the tubing rotates. Thus, the peripheral speed of the forming ring will be greater than the peripheral speed of the tubing and of the linear speed of the strip. Under such conditions, the lead of the thread on the forming ring should be opposite to the lead of the strip material.

In aid of understanding what happens under the conditions mentioned, one may draw a comparison with a screw turning within a nut. If the screw turns and the nut does not, the turning of a right-hand-threaded screw will move the nut from left to right, i.e. forward. This movement will at the ratio of one threaded pitch for each turn of the screw. Alternatively, if the nut is caused to turn in the same direction as the screw, but the screw turns twice as fast, the nut will tend to move from right to left, i.e. backward one threaded pitch for each revolution of the nut. However, during the same time the screw will have turned two revolutions and have tended to move the nut forward twice the thread pitch. The net result is a movement of the nut forward only one thread pitch.

Now, if the nut were of compressible material and the screw had but one thread convolution, and if anything retarded the forward movement of the nut, then the single convolution of the screw thread would tend to push each nut thread forwardly towards its neighbor, successively, as the screw thread acted on the nut threads in succession. In that way, the nut threads would be compressed.

Recapitulating and summarizing, the lead of the threads on the forming ring will be opposite the lead of the strip material when forming ring turns faster than and in the same direction as the tubing. This is the preferred condition.

Considering now the relation of the speed of the guide mandrel 10 and of the forming rings 26 when the forming rings rotate faster than the mandrel 10, the tube around the guide mandrel is drawn axially along it by the action of the forming rings on the tube, and the convolutions formed by the rings will then be closely spaced as they are formed.

A great advantage of this invention as distinguished from the machines and methods in our prior applications resides in the novel and simple means and methods to start compressing the convolutions immediately as one is formed after another. To that end additional forming rings 26b and 26c are mounted serially alongside ring 26a, all three being mounted on the extension 21 of the shaft 20 and keyed to rotate therewith by a key 25.

The rings 26b and 26c are of the same diameter as ring 26a but have helical ridges formed on their peripheries, like threads. The pitch of the thread on 26b is less than that of the single ridge or thread on the first forming ring 26a, while the pitch of the thread 26c is still less than on the pitch on 26b. For example, the pitch on the forming ring 26a may be 0.250", on the second ring 0.150", and on the third ring 0.100". The rings should be mounted so that as the tubing, formed with its helical rib, leaves the ring 26a, the rib will thread upon the thread or ridge of ring 26b, but due to the lesser pitch on ring 26b the ribs will be moved closer to each other as they move along ring 26b. The same applies to the relation of rings 26b and 26c and the movement of the formed tubing along and off ring 26.

The rings 26a and 26b and 26c may be and preferably will be formed as one piece, with the three different pitches of threads or ridges merging from end to end. Alternatively, the threads instead of being of three distinct pitches could be of gradually decreasing pitch from start to finish. The making of the rings in one piece minimizes and avoids scarring and the danger of tearing the tubing, which can occur if the three separates rings are not carefully machined and finished and properly adjusted when being assembled.

The compression or compacting the tubing as just described tends to avoid the need altogether for a compression mandrel 30 illustrated in FIGS. 1 and 2.

When a compression mandrel is used to further compress the tubing as it leaves the forming ring 26a, and forming rings 26b and 26c, the compression mandrel 30 is of approximately the same diameter as the guide mandrel 10 and is located on the opposite side of the forming ring from the guide mandrel 10. The compression mandrel is mounted on a shaft 32 coaxial with and within the hollow shaft 20. Bearings 27, 28 at opposite ends of the hollow shaft 10 and compression mandrel shaft 32 are located between those shafts so as to support and position the hollow shaft 20 and, in turn, the guide mandrel 10.

Since the compression mandrel need not be used with the three ring forming and compressing combination above described, the compression mandrel 30 is shown only for completeness in FIGS. 1 and 2 in the same form as in our copending application Ser. No. 523,825. (The form in our copending application Ser. No. 573,704 is also a satisfactory and desirable type.) For a full description of such mandrels, reference may be had to those copending applications.

When the compression mandrel is omitted the machine may be made as illustrated in FIG. 3. In that form the guide mandrel 210, like mandrel 10, is hollow. Mandrel 210 is stationary and is bolted through a flange thereon to a face plate 211 to the machine frame F. Concentrically within the guide mandrel is a rotating shaft 220. On an extension 220e of reduced diameter from one end of shaft 220 are mounted the rings 26a, 26b, 26c, which are keyed to the extension of key 25 so as to turn therewith. A nut 229 threaded on the end of the extension secures the rings in place. As mentioned in connection with FIG. 2, the three rings may be formed as a single, one-piece element.

From the foregoing, it may be understood that a tube is continuously formed from the strip material PS', and the wall of the tube is formed continuously with a continuous thread-like helical ridge and groove contour.

When a single element tubing is made of the particular form illustrated in FIG. 3, a single strip PS″ is fed at a fixed speed from a supply and is wound around the mandrel in such a way that in one turn of the strip around the mandrel, the strip travels axially along the mandrel only one-half the width of the strip. Thus, on the second turn around the mandrel, the trailing half of the first convolution of the strip is overlapped by the leading half of the succeeding or next convolution of the strip. This condition continues up to the forming ring 26a around which the overlapped strip is also wrapped. The forming ring creates the helical ribbing and, as previously indicated, causes the formed tubing to move axially. In this way tubing is produced with a double thickness wall from only one strip.

The invention is not limited, however, to the just described one-half overlap. The overlap may be more or less as desired.

The peripheral or circumferential speed of the tubing from the start of its formation on the guide mandrel 10 until it leaves the machine is the same. Since the forming rings rotate at a different speed from the mandrel 10, there is slippage between the forming rings and the tubing while the helical ribbing is being formed. There is contraction in axial length of the tubing as the ribbing is being formed.

The linear speed of the tubing axially along its course varies.

On the hollow guide mandrel 10, the longitudinal advance of the strip approximates the lead on the forming ring 26a times the revolutions per minute of the forming ring, minus one (1), depending on how much slippage of the forming ring occurs with respect to the tubing. The strip lead must be an exact multiple of thread pitch.

The speed of the forming ring should be such that it passes material equal to one lead of strip material for each turn of the formed tubing. For example, with a ¼ inch forming ring lead and a 1½ inch lead of the strip material on the guide mandrel, the forming ring should turn about seven (7) times for each turn of the formed tubing, the one turn being added on account of the similar rotational direction of the tubing and ring.

Thus, as the tubing leaves the machine, it has helical ribbed convolutions greater in diameter than the original winding diameter and is shortened in length by the axially compressed convolutions.

For driving the forming rings 26 and the guide mandrel if it is in any particular condition to be driven rather than remain stationary, an intermediate shaft 47 is journalled in two spaced pillow-box bearings 48, 48 mounted on the base B. Between the bearings 48 and upon shaft 47, a large gear 49 is affixed which meshes with and is driven by a smaller gear 51 affixed to a secondary drive shaft 50 mounted rotatably in two spaced pillow-box bearings 52, 52. The shaft 50 is driven by a sprocket 55 mounted on its end and a chain 56 which is also trained over a sprocket 57. This sprocket is affixed on a primary drive shaft 58 driven by a source of power through a sprocket 59 affixed on one end of the shaft 58. The shaft 58 is journalled in bearings 60, 61 mounted on the base B.

On the opposite end of primary drive shaft 58, a sprocket 62 is mounted which by a chain 63 drives a sprocket 22 mounted on the hollow shaft 20 which drives the forming ring 26.

When the guide mandrel 10 is to be rotated, it is driven by a chain 16 trained over the sprocket 12 on that mandrel and over a sprocket 53 fixedly mounted on the secondary drive shaft 50.

It will now be apparent that the mandrel 10 and forming rings 26 are driven from the primary drive shaft 58 through chains and sprockets whose teeth and gearing ratios are selected to give the desired speed of rotation as above indicated.

As previously noted, the guide mandrel 10 need not be power driven, but may remain stationary. The machine may be satisfactorily operated either way. Preferably the guide mandrel 10 is not power driven. It may be provided with helical grooves to guide strip material. The grooves are necessary when the mandrel is stationary and the strip material stretches, like paper, or has no body stiffness, like vinyl plastic strips. With metal foil like aluminum, the grooving is useful but not necessary.

FIG. 4 illustrate diagrammatically the feed of one or another of several strips from material supply rolls, such as 60, 62, around metal idler roller 63 which presses against a rubber covered power driven roll 64. The strip then goes around the rubber covered roll 64 and between it and a second metal idler roller 65 to the guide roll 10 or 210, as the case may be.

When the two-ply tubing is to be made, two strips from the supply rolls 60 and 62 are fed simultaneously between the power and idler rolls 63, 64 and 65 with the strip that is to be outside laid under the other strip as it winds around mandrel 26.

The invention may be used to generate multi-ply tubing in a manner similar to that disclosed in our co-pending applications Ser. Nos. 523,825 and 573,704.

With the improvements as described herein, as with the inventions of our copending applications 523,825 and 573,704, the manufacture of tubing with composite walls of many types and thicknesses (double wall or other plural wall) is possible within the scope of the invention by using the same or various different kinds of strip material of different or the same width and different degrees of lead along the guide mandrel.

In all the described forms and alternative modifications, the helical ribbing of the tubing locks together the successive convolutions of the wound strip or strips of material so that an integral continuous duct is formed which can be cut into any length desired.

The invention described and claimed herein is not limited to paper nor to a particular thickness and width of strip. As strip material, synthetic plastics such as polyethylene or polyvinyl chloride or other plastic materials in the form of thin films can be used, alone or laminated on another strip. Various types and kinds of paper from smooth surface kraft paper to rough surface paper like paper toweling may be used as well as aluminum or other thin metal foils, so long as the material used is capable of being formed into the desired shape as described, and is capable of retaining such shape and form.

In view of the foregoing, it is apparent that many modifications within the scope of the invention with respect to the tubing, the method of making it and the machine for making it will occur to those skilled in the art. Therefore, the invention is not limited to the specific embodiments illustrated and described.

What is claimed is:

1. A machine for generating helically wound tubing from strip material with helical ribbing, comprising a mandrel guiding a strip of material as it is wound helically from a stationary supply with the trailing edge of one convolution of the strip overlapped by the leading edge of the next succeeding convolution of the strip, rotatable forming means separated from said mandrel, means to rotate said forming means, said forming means having a convoluted rib formation for engaging and exerting internal pressure on the wound strip to generate an external helical ridge in the wound strip and form unitary tubing, said convoluted formation being of less pitch at the tube-exit end than at the tube-entering end thereof and pressing the convolutions of the tubing closer together axially as the tubing proceeds along said convoluted formation.

2. A machine as claimed in claim 1 wherein the convoluted formation comprises at least two groups of helical ribs, the pitch of the second group being less than the pitch of its predecessor and the pitch of the group following said second group being of still less pitch.

3. A machine as claimed in claim 2 having a compression mandrel onto which the helically ribbed tubing is fed, said mandrel having means to retard the movement of the tubing therealong.

4. A machine as claimed in claim 1 wherein the rib formation is in the form of progressively more closely spaced continuous convolutions, whereby the convolutions of the tubing are progressively compacted axially as the tubing moves along the compression means.

5. A machine as claimed in claim 4 having a compression mandrel on to which the helically ribbed tubing is fed, said mandrel having means to retard the movemenst of the tubing therealong.

6. A machine as claimed in claim 1 having a compression mandrel on to which the helically ribbed tubing is fed, said mandrel having means to retard the movement of the tubing therealong.

7. The method of making continuous helically ribbed tubing from thin strip material comprising the steps of helically winding strip material continuously from a stationary supply with the trailing edge of a previously formed convolution overlapped by the leading edge of the next succeeding convolution, rotating the thus-formed tubing, and extering internal pressure on the tubing along a helical path to form a helical exterior ridge in the surface of the tubing at a rotational rate greater than the rate of rotation of the tubing so that the convolutions of the helical ridges thus formed interlock the overlapped convolutions of the strip to generate unitary continuous tubing, and the further step of engaging the internal sidewalls of the helical ridges with thread-like formations to compact the helical ridges axially.

8. The method of making continuous helically ribbed tubing from thin strip material comprising the steps of helically winding strip material continuously from a stationary supply with the trailing edge of a previously formed convolution overlapped by the leading edge of the next succeeding convolution, extering internal pressure on the tubing along a helical path to form a helical exterior ridge in the surface of the tubing at a rotational rate greater than the rate of rotation of the tubing so that the convolutions of the helical ridges thus formed interlock the overlapped convolutions of the strip to generate unitary continuous tubing, and the further step of compacting the convolutions of the helical ridges, axially, by exerting on them an axially compressive force by threading the formed tubing onto at least one externally helically threaded member whose threads are of less pitch than the convolutions of the helical ridges.

9. The method of making continuously helically ribbed tubing from thin strip material comprising the steps of helically winding strip material continuously from a stationary supply with the trailing edge of a previously formed convolution overlapped by the leading edge of the next succeeding convolution, and extering internal pressure on the tubing along a helical path to form a helical exterior ridge in the surface of the tubing at a rotational rate greater than the rate of rotation of the tubing so that the convolutions of the helical ridges thus formed interlock the overlapped convolutions of the strip to generate unitary continuous tubing, and the further step of compatcing the convolutions of the helical ridges, axially, in progression by exerting on the ridges successive axially compressive forces in groups of helical formations which engage the interior of the formed tubing, the turns of each group being of less pitch than the convolutions of the tubing fed on to it.

10. The method of making continuous helically ribbed tubing from thin strip material comprising the steps of helically winding strip material continuously from a stationary supply with the trailing edge of a previously formed convolution overlapped by the leading edge of the next succeeding convolution, and exerting internal pressure on the tubing along a helical path to form a helical exterior ridge in the surface of the tubing at a rotational rate greater than the rate of rotation of the tubing so that the convolutions of the helical ridges thus formed interlock the overlapped convolutions of the strip to generate unitary continuous tubing, and the further step of compacting the convolutions of the helical ridges, axially, in progression by exerting on the ridges axially compressive forces of convoluted-rib formation which engage the interior of the formed tubing, the convolutions of said formation being continuous and progressively more closely spaced whereby the convolutions of the ridges of the tubing are progressively compacted axially.

References Cited

UNITED STATES PATENTS

| 2,033,717 | 3/1936 | Kopetz | 93—80 |
| 2,757,706 | 8/1956 | Johnston | 93—80 |
| 2,559,191 | 7/1951 | Hussnigg | 93—80 |
| 2,935,003 | 5/1960 | Harris | 93—80 |

FOREIGN PATENTS 647,515  12/1950  Great Britain.

CHARLES W. LANHAM, Primary Examiner

A. L. HAVIS, Assistant Examiner

U.S. Cl. X.R.

72—49